United States Patent
Sato et al.

(10) Patent No.: US 10,875,009 B2
(45) Date of Patent: *Dec. 29, 2020

(54) GAS-ADSORBING MATERIAL AND VACUUM INSULATION MATERIAL INCLUDING THE SAME

(71) Applicant: Samsung Electronics Co., Ltd., Suwon-si (KR)

(72) Inventors: Nagahisa Sato, Yokohama (JP); Ryosuke Kamitani, Yokohama (JP); Kenichi Nagayama, Yokohama (JP); Tomokazu Fukuzaki, Yokohama (JP)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/533,146

(22) Filed: Aug. 6, 2019

(65) Prior Publication Data

US 2019/0366301 A1 Dec. 5, 2019

Related U.S. Application Data

(63) Continuation of application No. 14/920,261, filed on Oct. 22, 2015, now Pat. No. 10,421,059.

(30) Foreign Application Priority Data

Oct. 24, 2014 (JP) .................................. 2014-217230
Apr. 21, 2015 (KR) ........................ 10-2015-0056033
Jul. 9, 2015 (JP) .................................. 2015-138132

(51) Int. Cl.
*B01J 20/32* (2006.01)
*B01J 20/02* (2006.01)
(Continued)

(52) U.S. Cl.
CPC ......... *B01J 20/28016* (2013.01); *B01J 20/02* (2013.01); *B01J 20/041* (2013.01);
(Continued)

(58) Field of Classification Search
None
See application file for complete search history.

(56) References Cited

U.S. PATENT DOCUMENTS 3,993,453 A    11/1976 Ross et al.
4,705,675 A    11/1987 Desmond et al.
(Continued)

FOREIGN PATENT DOCUMENTS

CN    102302923 A    1/2012
CN    103721670 A    4/2014
(Continued)

OTHER PUBLICATIONS

Extended European Search Report dated Mar. 22, 2016, issued in corresponding European Application No. 15190961.1.
(Continued)

*Primary Examiner* — Joseph D Anthony
(74) *Attorney, Agent, or Firm* — Harness, Dickey & Pierce, P.L.C.

(57) ABSTRACT

Example embodiments relate to a gas-adsorbing material capable of reducing the generation amount of combustible gas without deteriorating gas-adsorbing performance, and a vacuum insulation material including the gas-adsorbing material. The gas-adsorbing material may include a metal selected from at least one of Li, V, Zr, or an alloy including the same, which adsorbs a nitrogen gas and is inactivated by moisture as a nitrogen adsorbing agent, and an additive added to the metal. The metal is attached on the particle surface of the additive. The metal may be an alloy including Li and an alkaline-earth metal, for example, Ba—Li alloy.
(Continued)

The additive absorbs moisture, and is selected from at least one of an inorganic oxide, a transition metal, an oxide of a transition metal, an alloy including a transition metal, and a mixture including a transition metal.

21 Claims, 12 Drawing Sheets

(51) Int. Cl.
  *B01J 20/06* (2006.01)
  *B01J 20/04* (2006.01)
  *B01J 20/18* (2006.01)
  *B01J 20/28* (2006.01)

(52) U.S. Cl.
  CPC .............. *B01J 20/06* (2013.01); *B01J 20/18* (2013.01); *B01J 20/3204* (2013.01); *B01J 20/3236* (2013.01); *B01J 20/3293* (2013.01)

(56) References Cited

U.S. PATENT DOCUMENTS

| | | | |
|---|---|---|---|
| 4,920,152 A | 4/1990 | Regnier et al. | |
| 5,312,606 A | 5/1994 | Boffito et al. | |
| 5,544,490 A * | 8/1996 | Manini | A47J 41/022 62/46.1 |
| 5,600,957 A | 2/1997 | Manini et al. | |
| 5,885,682 A | 3/1999 | Tanimoto et al. | |
| 6,200,494 B1 | 3/2001 | Manini et al. | |
| 6,420,002 B1 | 7/2002 | Aggas et al. | |
| 6,620,297 B2 | 9/2003 | Conte et al. | |
| 6,652,626 B1 | 11/2003 | Plee | |
| 6,783,696 B2 | 8/2004 | Conte et al. | |
| 7,126,276 B2 * | 10/2006 | Hasegawa | B01J 20/02 313/553 |
| 7,833,327 B2 | 11/2010 | Hirai et al. | |
| 7,977,277 B2 | 7/2011 | Giannantonio et al. | |
| 8,003,707 B2 | 8/2011 | Holland | |
| 8,834,576 B1 | 9/2014 | Serafin, Jr. | |
| 10,421,059 B2 * | 9/2019 | Sato | B01J 20/06 |
| 10,549,257 B2 * | 2/2020 | Nagayama | B01J 20/28004 |
| 2002/0167262 A1 * | 11/2002 | Porter | H01J 29/58 313/483 |
| 2008/0200332 A1 * | 8/2008 | Giannantonio | B01J 20/0222 502/402 |
| 2008/0237244 A1 | 10/2008 | Tsukahara et al. | |
| 2012/0121804 A1 | 5/2012 | Sekino et al. | |
| 2017/0314884 A1 | 11/2017 | Winiecki | |
| 2017/0348669 A1 | 12/2017 | Nagayama et al. | |

FOREIGN PATENT DOCUMENTS

| | | |
|---|---|---|
| CN | 103759098 A | 4/2014 |
| CN | 103949206 A | 7/2014 |
| EP | 715138 A2 | 6/1996 |
| JP | 1993131134 A | 5/1993 |
| JP | 1996159377 | 6/1996 |
| JP | H08159377 A | 6/1996 |
| JP | 2627703 B2 | 7/1997 |
| JP | H11336990 A | 12/1999 |
| JP | 3105542 B2 | 11/2000 |
| JP | 3182083 B2 | 7/2001 |
| JP | 2003-022744 A | 1/2003 |
| JP | 2004-509757 A | 4/2004 |
| JP | 2005-090819 A | 4/2005 |
| JP | 2006046512 A | 2/2006 |
| JP | 2006075756 A | 3/2006 |
| JP | 2008239172 A | 10/2008 |
| JP | 2009-502472 A | 1/2009 |
| JP | 2010149913 A | 7/2010 |
| JP | 4797614 B2 | 10/2011 |
| JP | 4823750 B2 | 11/2011 |
| JP | 4887658 B2 | 2/2012 |
| JP | 2013028501 A | 2/2013 |
| KR | 1999-0014065 A | 2/1999 |
| KR | 20130019966 A | 2/2013 |
| KR | 20130087366 A | 8/2013 |
| KR | 20140112632 A | 9/2014 |
| WO | WO-98/43763 A1 | 10/1998 |
| WO | WO-00/75950 A1 | 12/2000 |
| WO | WO-2007/013119 A1 | 2/2007 |
| WO | WO-2013/100492 A1 | 7/2013 |

OTHER PUBLICATIONS

European Office Action for corresponding European Application No. 15190961.1 dated Nov. 3, 2017.

Japanese Office Action dated May 13, 2019 issued in corresponding Japanese Patent Application No. 2015-138132 (English translation provided).

Chinese Office Action dated Jul. 9, 2019 issued in corresponding Chinese Application No. 201510698278.5 (English translation provided).

* cited by examiner

GAS-ADSORBING MATERIAL AND VACUUM INSULATION MATERIAL INCLUDING THE SAME

CROSS-REFERENCE TO RELATED APPLICATIONS

This application is a continuation of U.S. application Ser. No. 14/920,261, filed on Oct. 22, 2015, now granted as U.S. Pat. No. 10,421,059 on Sep. 24, 2019, which claims priority under 35 U.S.C. § 119 to Japanese Patent Application Nos. 2014-217230, and 2015-138132, filed in the Japanese Patent Office on Oct. 24, 2014, and Jul. 9, 2015, respectively, and Korean Patent Application No. 10-2015-0056033, filed in the Korean Intellectual Property Office on Apr. 21, 2015, the entire contents of each of which are incorporated herein by reference.

BACKGROUND

1. Field

Example embodiments relate to a gas-adsorbing material and a vacuum insulation material using the gas-adsorbing material. The gas-adsorbing material may be used in various fields in which a vacuum is maintained, such as for removing trace gases in inactive gases, a gas in a fluorescent lamp, and the like.

2. Description of the Related Art

There has been increasing interest in a vacuum insulation material having improved insulating effects for electronic appliances, machinery, and equipment in order to conserve energy. A vacuum insulation material may be manufactured by covering a core material having micropores (such as glass wool, silica powder, or the like) with an exterior material having gas barrier properties, and then sealing the inside of the exterior material under a reduced pressure. To maintain the improved insulating effect of the vacuum insulation material for a relatively long period of time, adsorbing materials for removing an aqueous vapor or gas (such as oxygen, nitrogen, and the like) that infiltrates into the vacuum insulation material are sealed with the core material in the vacuum insulation material under a reduced pressure.

Among the adsorbing materials, a chemically adsorbing material irreversibly fixing and adsorbing moisture may be appropriate for the vacuum insulation material. One example of such a moisture adsorbing material is calcium oxide (CaO). However, a moisture adsorbing material such as the calcium oxide may not adsorb oxygen and nitrogen which may permeate through the exterior material of the vacuum insulation material from the air.

A metallic material formed of a barium getter or a ternary alloy of zirconium-vanadium-iron may be used as an adsorbing material capable of adsorbing oxygen or nitrogen. However, these adsorbing materials need to be activated at a relatively high temperature of greater than or equal to about 400° C. under a reduced pressure environment. However, such adsorbing materials should not be heated, because the reduced pressure environment is set by using an exterior material by multi-layering a plastic film and a metal foil, and the exterior material may be molten and broken.

A getter material needing no activation under a reduced pressure may be, for example, a nitrogen-adsorbing Ba—Li alloy, and specifically, a vacuum insulation material using the Ba—Li alloy as a nitrogen getter material. The Ba—Li alloy may be mixed with an adsorbing material (a moisture-adsorbing material) to allow the getter material to stand in the air for a longer time.

In addition, subdivided Ba—Li-based alloys can adsorb nitrogen without activation at a high temperature. Furthermore, a getter apparatus may be manufactured by combining a Ba—Li alloy and an adsorbing material. The Ba—Li alloy may be placed in a metal container and the like that passes no moisture, while the adsorbing material may be placed in contact with the external environment in order to prevent inactivation of the Ba—Li alloy by moisture.

SUMMARY

A Ba—Li alloy has a relatively high reactivity with water and loses gas-adsorbing activity when it reacts with the water, and simultaneously generates hydrogen gas as shown in the following reaction schemes. Water may be sprayed to prevent scattering of dust when electronic appliances are crushed after use. Therein, a gas-adsorbing material along with a vacuum insulation material is crushed, exposing a gas-adsorbing metal such that the gas-adsorbing metal contacts the water, and thus a relatively large amount of hydrogen is rapidly generated which may ignite and cause an explosion.

When a bulk or particle-shaped alloy is compressed and shaped into a lump and then reacted with moisture, 442 cc of hydrogen gas per 1 g of the Ba—Li alloy is generated according to the following Reaction Schemes 1 and 2.

  (Reaction Scheme 1)

  (Reaction Scheme 2)

On the other hand, a solid generating greater than or equal to about 200 cc/g of combustible gas such as hydrogen when reacted with water is classified into a water-prohibiting material according to a danger criteria regarding a test to determine if a related material belongs to a third dangerous material (a spontaneous combustible material and a water-prohibiting material) of the Fire Services Act. Accordingly, the Ba—Li alloy generates hydrogen at a much higher rate than the above criteria, and thus belongs to the water-prohibiting material, i.e. a material classed as a hazardous when wet.

In order to reduce the amount of hydrogen gas to a safe level, an additive such as an adsorbing material may be added to the Ba—Li alloy, and thus the amount of the Ba—Li alloy per unit mass can be reduced.

However, the Ba—Li alloy is easily inactivated by even a little moisture derived from the additive, and thus may not exert as much gas-adsorbing performance as initially designed before crushing the gas-adsorbing material. Accordingly, example embodiments relate to a gas-adsorbing material capable of reducing the generation amount of combustible gas and avoiding deterioration of the gas-adsorbing performance. In addition, example embodiments relate to a vacuum insulation material using the gas-adsorbing material.

According to one example embodiment, the gas-adsorbing material includes a gas-adsorbing composition including a metal (that may be inactivated by moisture) as a target gas-adsorbing component and an additive capable of absorbing moisture added to the metal in order to accomplish the purpose, and herein, the metal is attached on the particle surface of the additive.

According to an example embodiment, the metal may be at least one of Li, V, Zr, or an alloy including the same.

The metal may be an alloy including Li and an alkaline-earth metal, for example, a Ba—Li alloy.

According to an embodiment, the additive added to the metal may be at least one of an inorganic oxide, a transition metal, an oxide of a transition metal, an alloy including a transition metal, and a mixture including a transition metal.

The inorganic oxide may be an oxide of at least one alkaline-earth metal having a moisture-absorption property, for example a calcium oxide.

The transition metal may be at least one of Ti, Ni, and Fe.

According to another embodiment, the gas-adsorbing material may further include a moisture-absorbing material, in addition to the metal and the additive added to the metal.

In an example embodiment, the moisture-absorbing material may coat the gas-adsorbing composition including the metal and the additive added to the metal, and herein, the moisture-absorbing material may be disposed in a region exposed to a target gas in a target gas adsorption region of the gas-adsorbing composition.

In another example embodiment, the metal is admixed with the additive in a ratio such that the amount of a combustible gas generated from the gas-adsorbing material is less than or equal to 200 cc/g.

In addition, the vacuum insulation material according to another example embodiment includes the gas-adsorbing material and exerts an insulating effect when put in a thermally conductive region in an internal environment set under a reduced pressure.

DETAILED DESCRIPTION

Figure 1:
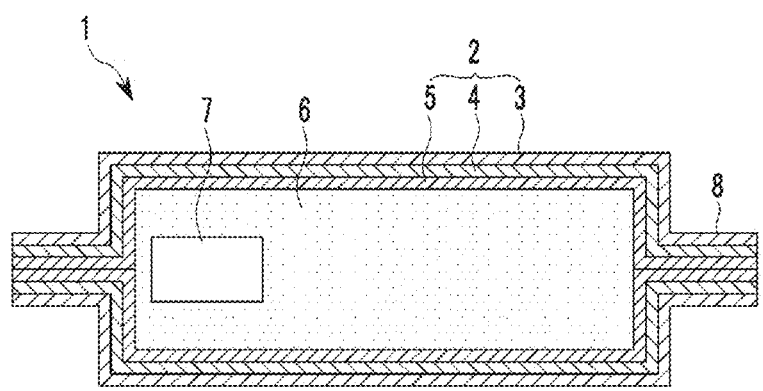
FIG. 1 is a schematic cross-sectional view showing an example embodiment of a vacuum insulation material.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein. Hereinafter, various example embodiments will be described in further detail with reference to the drawings.

An embodiment relates to a gas-adsorbing material including a gas-adsorbing composition that includes a metal having a nitrogen-adsorbing property and being inactivated by moisture as a nitrogen-adsorbing component, which is at least one of Li, V, Zr, or an alloy including the same, and an additive in a form of a plurality of particles, where the metal is attached on a surface of a particle of the additive.

The metal is highly reactive, and thus its gas-adsorbing property may be deteriorated by contacting nitrogen or moisture by handling before preparation or during preparation. However, according to an embodiment, by attaching the metal on a surface of a particle of the additive, the gas-adsorbing property of the metal may be restored to exhibit its original property.

According to an embodiment, the additive is a mother material or a substrate to which the metal as a nitrogen-adsorbing component is attached. Further, the additive may facilitate the adjustment of the amount of the metal as a target gas-adsorbing material based on a unit volume of the additive.

In one example embodiment, the amount of a combustible gas generation per unit time of the gas-adsorbing material may be reduced. For example, the embodiment may reduce the amount of generation of hydrogen. Accordingly, an explosion due to a contact of the gas-adsorbing material and hydrogen may be suppressed, whereby safetiness may be improved.

According to an embodiment, the gas-adsorbing material includes a metal as a nitrogen-adsorbing component. The metal may be inactivated by moisture, and may be at least one of Li, V, Zr, or an alloy including the same. In view point of easy purchasing and handling, an alloy including Li and an alkaline-earth metal, for example, a Ba—Li alloy, may be used. Ba—Li alloy may be prepared by using a known ratio of the composition, or may be obtained by purchasing, and is not limited thereto, as long as the effect as described above is obtained.

The additive may be any material, as long as it is possible for a metal to be attached to a surface of a particle of material. By providing a gas-adsorbing composition including a metal attached to a surface of a particle of an additive, the gas-adsorbing material according to an embodiment may have good safetiness. Meanwhile, the term "attachment" is defined in detail in the description that follows.

The additive may be at least one of an inorganic oxide, a transition metal, an oxide of a transition metal, an alloy including a transition metal, and a mixture including a transition metal.

The inorganic oxide may be, for example, an oxide of at least one alkaline-earth metal, for example, a calcium oxide.

The transition metal may be at least one of Ti, Ni, Fe, an alloy including the same, an oxide thereof, or a mixture thereof.

The additive may be used alone or in a combination with another.

In an example embodiment, gas-adsorbing rate may be controlled by adjusting the amount of the metal in the gas-adsorbing composition with the ratio between the metal and the additive.

According to an embodiment, the gas-adsorbing composition adsorbs a target gas upon contacting the target gas. In an example embodiment, an area that is able to contact with a target gas is referred to as "a target gas-adsorbing region".

In an embodiment, a gas-adsorbing composition including a metal attached to a surface of a particle of an additive may be covered with a moisture-absorbing material, where the moisture-absorbing material may be disposed in a region exposed to a target gas in the target gas-adsorbing region of the gas-adsorbing composition. A vacuum insulation material fabricated by using an article including the gas-adsorbing composition may reduce the amount of a target gas contacted with the gas-adsorbing composition during fabrication. Accordingly, a rapid inactivation of gas-adsorbing property of the metal may be avoided, and thus, a longer lifespan of a vacuum insulation material may be achieved.

In an example embodiment, the moisture-absorbing material may be selected from the materials known in the art. For example, calcium oxide, magnesium oxide, strontium oxide, barium oxide, and the like, may be used, and it is not limited thereto.

The gas-adsorbing material may be disposed in an interior of a vacuum insulation material to adsorb a target gas. The target gas may be nitrogen gas. In addition, hydrogen gas or oxygen gas may further be adsorbed.

In an example embodiment, gas-adsorbing property may be measured by measuring change of pressure of a target gas in a predetermined volume. Pressure of a target gas may be measured by using a known pressure-measuring gauge.

In an example embodiment, safetiness may be measured by measuring the amount of a combustible gas generated by the gas-adsorbing material exposed in the air. The amount of a combustible gas generated may be measured by using a an apparatus for measuring the amount of a gas known in the art. The details are described in the Examples.

FIG. 1 is a schematic cross-sectional view showing an example embodiment of a vacuum insulation material.

In FIG. 1, gas-adsorbing material 7 is sealed in the interior of an outer material 2, along with a core material 6.

Figure 2:
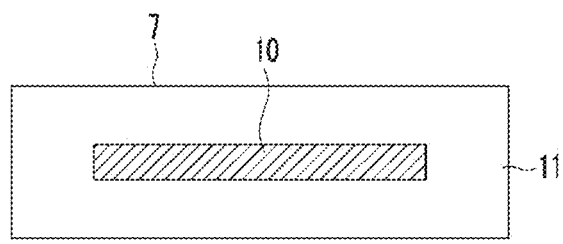
FIG. 2 is an explanatory view showing the composition of the gas-adsorbing material shown in FIG. 1.
Figure 9:
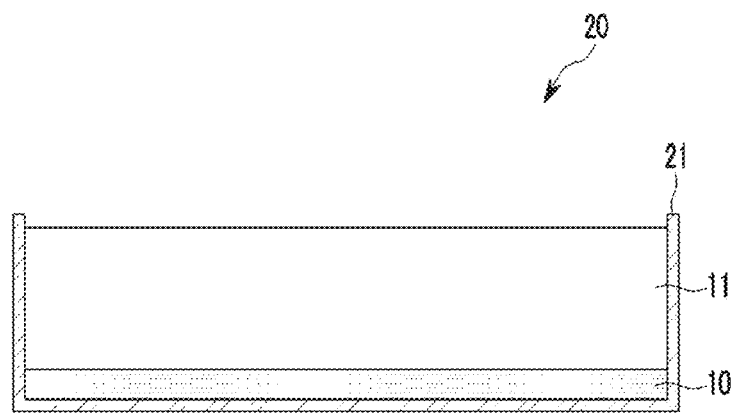
FIG. 9 is an explanatory view showing another composition of the gas-adsorbing material (Example 3).

FIG. 2 and FIG. 9 are explanatory views showing the composition of the gas-adsorbing material shown in FIG. 1.

Figure 10:
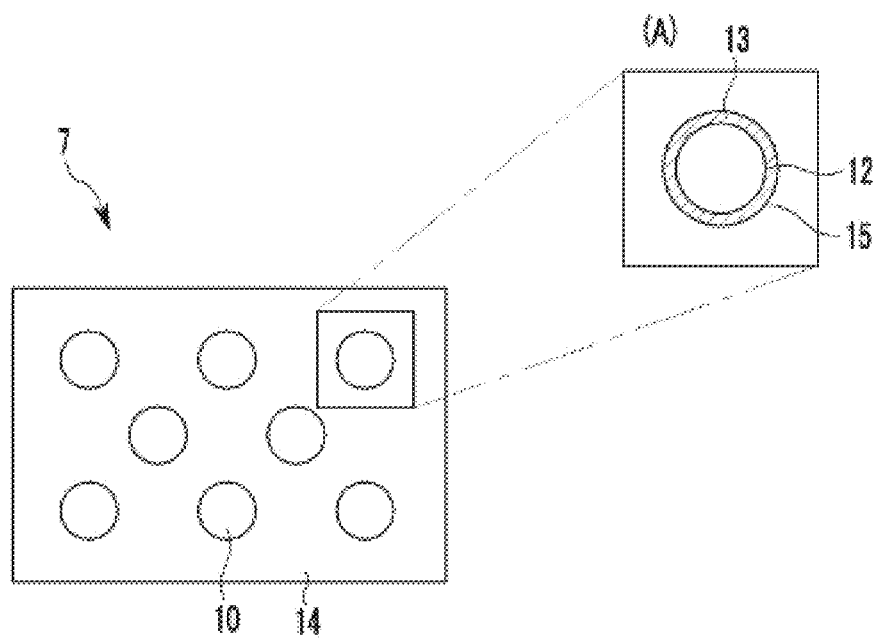
FIG. 10 is a schematic view showing a gas-adsorbing composition according to an example embodiment.

In FIG. 2 and FIG. 9, 10 indicates gas-adsorbing material, and 11 indicates moisture-adsorbing material.

FIG. 10 is a schematic view showing a gas-adsorbing material according to an example embodiment.

In FIG. 10, (A) indicates an enlarged schematic view showing gas-adsorbing composition in which a metal is attached to the additive. As shown in FIG. 10, metal 13 is attached on a surface of a particle of additive 12 as a mother material according to an example embodiment.

According to an embodiment, nitrogen gas-adsorbing property tends to increase as the amount of the metal increases in the gas-adsorbing composition. Accordingly, as shown in FIG. 10, the surface of a particle of the additive 12 may be entirely covered with the metal 13 to have a homogeneous thickness of the coating. Such gas-adsorbing composition includes an interior layer and an exterior layer disposed on the interior layer, where the additive constitutes the interior layer, and the metal constitutes the exterior layer. However, the attachment of the metal to the surface of the additive is not limited thereto. For example, a part of the surface of the additive may not be coated with the metal, as long as the same effect according to an embodiment may be obtained. Further, the thickness of the exterior layer, which is constituted by the metal, may not be homogeneous. The attachment may be varied by changing admixing ratio of the metal and the additive, diameter of a particle of the additive, temperature during fabrication, and the like.

In FIG. 10, 14 indicates a moisture-absorbing material. Moisture-absorbing material may cover the gas-adsorbing composition, and may be located on at least a region exposed to a target gas in a target gas-adsorbing region of the target gas-adsorbing composition.

In FIG. 10, target gas-adsorbing region 15 corresponds to the interface region between the gas-adsorbing composition and moisture-absorbing material.

In FIG. 10, the gas-adsorbing composition is dispersed in the moisture-absorbing material.

In an example embodiment, an article fabricated by coating the gas-adsorbing composition with a moisture-absorbing material. In the article, the gas-adsorbing composition may be homogeneously or unhomogeneously dispersed in the moisture-absorbing material.

When the amount of target gas contacting with the article is different depending on the regions of the article, the gas-adsorbing composition may be unhomogeneously dispersed in the moisture-absorbing material. For example, the gas-adsorbing composition may be located near the region where the amount of target gas contacting with the article is huge, and the target gas may be effectively adsorbed.

When the amount of target gas contacting with the article is not different depending on the regions of the article, the gas-adsorbing composition may be homogeneously dispersed in the moisture-absorbing material, such that the gas-adsorbing composition can adsorb a target gas homogeneously throughout the article.

Meanwhile, the gas-adsorbing composition and the moisture-absorbing material may be disposed such that the amount of a target gas contacting with the gas-adsorbing composition can be reduced during fabrication, and thus the disposition is not limited to the example embodiment as shown in FIG. 10.

In an example embodiment, as shown in FIG. 2 or FIG. 9, the gas-adsorbing material may be coated with a moisture-adsorbing material. Moisture-adsorbing material may be calcium oxide, magnesium oxide, strontium oxide, barium oxide, and the like. As such, moisture-adsorbing material may be the same material as the moisture-absorbing material. In this case, in a process of fabrication according to an embodiment, the article coated with the gas-adsorbing material may be calcined to integrate the moisture-absorbing material and moisture-adsorbing material.

In one example embodiment, a gas-adsorbing material is a nitrogen-adsorbing material. The nitrogen-adsorbing material may be, for example, used to remove nitrogen gas in a vacuum insulation material. However, it should be understood that an adsorbing material according to example embodiments is not limited to an article having a particular use.

A vacuum insulation material may cover a core material having micropores (such as glass wool or silica powder) with an exterior material having gas barrier properties and seal the inside of the exterior material under a reduced pressure. The vacuum insulation material may be used for a freezer, a refrigerator, a hot water supply, a heat insulating material for an automobile, a building, a vending machine, a cold reserving box, a thermostat, a cold-reserving car, and the like.

FIG. 1 is a cross-sectional view schematically showing an example embodiment of a vacuum insulation material 1. As shown in FIG. 1, the vacuum insulation material 1 may be prepared by inserting a core material 6 and a gas-adsorbing material 7 between two sheets of an exterior material 2, and then closing and sealing the exterior material 2.

The two sheets of the exterior material 2 may be shaped as a bag with one open end and sealed (for example, heat-sealed) sides, wherein the opening is sealed (for example, heat-sealed) after inserting the core material 6 and the gas-adsorbing material 7 in the bag and reducing its internal pressure. Reference numeral 8 represents a bonding part where the opening of the bag is sealed. Alternatively, rather than using two sheets, the exterior material 2 may be in the form of a single sheet that is folded and sealed to form a bag for receiving the core material 6 and the gas-adsorbing material 7.

Hereinafter, each member of the vacuum insulation material 1 according to example embodiments will be discussed in further detail. According to one example embodiment, the exterior material 2 may be any material having gas barrier properties and capable of suppressing gas permeation.

In general, the exterior material 2 may be provided with gas barrier properties by laminating a plastic film formed of a thermoplastic resin, a metal foil, or the like. The exterior material 2 plays a role in isolating the core material 6 from air and/or moisture.

As shown in FIG. 1, a laminate film used for the exterior material 2 may have a thermally-bonding layer (a thermal bonding film) 5 as an innermost layer, a metal foil or a metal deposition layer of a gas barrier layer (a gas barrier film) 4 as a middle layer, and a surface protection layer (a surface protection film) 3 as an outermost layer.

The thermal bonding film 5 may be obtained by melting the thermal bonding layer of the exterior material 2 with heat and pressure followed by solidification of the molten layer. The thermal bonding film 5 plays a role of providing the exterior material 2 with a predetermined or desired shape. In addition, the thermal bonding film 5 plays a role in suppressing the permeation of a gas (e.g., aqueous vapor) into the vacuum insulation material 1 from the end of the exterior material 2.

The thermal bonding film 5 is not particularly limited as long as it may be adhered by a general sealing method (for example, a heat sealing method). A material constituting the thermal bonding film 5 may be, for example, a polyolefin such as low-density polyethylene, linear low-density polyethylene, high-density polyethylene, and polypropylene, a thermoplastic resin such as an ethylene-vinyl acetate copolymer, an ethylene-methacrylic acid copolymer, an ethylene-acrylate ester copolymer, an ethylene-methacrylate ester copolymer, and polyacrylonitrile. The above materials may be used individually or as a mixture of two or more kinds thereof to form the thermal bonding film 5.

The thermal bonding film 5 may be a single layer or a laminate of two or more layers. In the case of the latter, each layer may have the same composition or different compositions.

A thickness of the thermal bonding film 5 is not particularly limited. For example, the thermal bonding film 5 may have a thickness of about 10 μm to about 100 μm. When thinner than about 10 μm, the contact strength of the thermal bonding film 5 may be insufficient on the heat seal. On the other hand, when thicker than about 100 μm, the workability (such as bending properties) of the thermal bonding film 5 may be deteriorated. Furthermore, when the thermal bonding film 5 has a laminate structure of two or more layers, the thickness of the thermal bonding film should be understood to mean the total thickness of the layers. The individual thickness of each layer may be the same or different in the laminate structure.

The gas barrier film 4 may include a metal foil (such as an aluminum foil, a copper foil, or the like), a polyethylene terephthalate film, a film obtained by depositing metal atoms (such as aluminum, copper, or the like), or a metal or a semi-metal oxide (such as alumina, silica, or the like) on an ethylene-vinyl alcohol copolymer and the like without a particular limit. In addition, the thickness of the gas barrier film 4 is not particularly limited.

The material for forming the surface protection film 3 is not particularly limited. The material constituting the surface protection film may be, for example, a polyamide (nylon) (PA) such as nylon-6, nylon-66, and the like, a polyester such as polyethylene terephthalate (PET), polyethylene naphthalate (PEN), polybutylene terephthalate (PBT), and the like, a polyolefin such as polyethylene (PE), polypropylene (PP), polystyrene (PS), and the like, polyimide, polyacrylate, polyvinyl chloride (PVC), polyvinylidene chloride (PVDC), an ethylene-vinyl alcohol copolymer (EVOH), a polyvinyl alcohol resin (PVA), polycarbonate (PC), polyether sulfone (PES), polymethylmethacrylate (PMMA), a polyacrylonitrile resin (PAN), and the like.

A thickness of the surface protection film 3 is not particularly limited. For example, the surface protection film 3 may have a thickness of about 10 μm to about 100 μm. When the thickness of the surface protection film 3 is less than about 10 μm, the protection of the gas barrier film 4 may not be sufficient. On the other hand, when the surface protection film 3 is thicker than about 100 μm, the workability (such as bending properties) may be deteriorated as in the case of the thermal bonding film 5.

Furthermore, when the surface protection film 3 has a laminate structure of two or more layers, the thickness of the surface protection film 3 should be understood to mean the total thickness of the layers. The individual thickness of each layer may be the same or different in the laminate structure.

The films of the exterior material 2 may include one or more additives (e.g., stabilizers), for example, an antistatic agent, an ultraviolet (UV) blocking agent, a plasticizer, a lubricant, or the like. The additives may be used individually or as a mixture of two or more kinds thereof. Furthermore, the surface protection film 3 may be a single layer or a laminate of two or more layers. In the latter case, each layer of the laminate may have the same composition or different compositions.

The thickness of the exterior material 2 is not particularly limited. For example, the thickness may be in a range of about 1 μm to about 100 μm. A relatively thin exterior material 2 may more efficiently suppress and prevent a heat bridge and thus improve insulation performance, and also show improved gas barrier properties and workability.

In addition, an exterior material 2 including a gas barrier film 4 may have at least two sides of a laminate film disposed with a metal foil and with no metal foil, and the side of the laminate film disposed with no metal foil may have at least either one film layer formed of an ethylene-vinyl alcohol copolymer resin composition and deposited with aluminum at the inner side, or formed of a polyethylene terephthalate resin composition and deposited with aluminum at the inner side.

In addition, the exterior material 2 according to one example embodiment may not be a laminate film, but for example, may be a metal container, a glass container, or a gas barrier container formed by laminating a resin and a metal. Such a plastic laminate film container may be obtained by laminating one or more selected from polyvinylidene chloride, polyvinyl alcohol, polyester, polypropylene, polyamide, polyethylene, a metal deposition film, and the like.

As shown in FIG. 1, the core material 6 is disposed inside of the exterior material 2. The core material 6 according to one example embodiment plays a role of a framework of a vacuum insulation material, and forms a space where the gas-adsorbing material is applied. Herein, the material of the core material 6 is not particularly limited.

For example, the core material 6 may be an inorganic fiber such as glass wool, rock wool, an alumina fiber, a metal fiber formed of a metal with low thermal conductivity, and the like; an organic fiber such as a synthetic fiber such as polyester or polyamide, acrylic, polyolefin, aramid, and the like; cellulose manufactured from wood pulp; a natural fiber such as cotton, linen, wool, and silk; a recycling fiber such as rayon, a semisynthetic fiber such as cellulose acetate; and the like. The core material 6 may be one type of material or a mixture of two or more types of materials. For example, glass wool may be used as the core material 6. The core material 6 formed of the above materials has a relatively high elasticity and a relatively low thermal conductivity (in the fibers), and is industrially inexpensive.

The gas-adsorbing material 7 of FIG. 1 may have a structure in which a compression-shaped article is obtained by coating an opening of a (nitrogen) gas-adsorbing composition 10 containing a gas-adsorbing metal and an additive as main materials with a moisture adsorbing material 11 so as to be stored in a hard case having a gas-permeable opening as shown in FIG. 9, or in a gas-permeable film as shown in FIG. 2. As a result of coating the gas-adsorbing composition with the moisture adsorbing material, as shown in FIG. 2, the article comprised of the gas adsorbing composition 10 and moisture adsorbing material 11 includes an interior layer and an exterior layer formed outside the interior layer. The interior layer is constituted by the gas adsorbing composition 10, and the exterior layer is constituted by the moisture adsorbing material 11. Further, as shown in FIG. 9, the gas adsorbing composition 10 is laminated with moisture adsorbing material 11. The gas-permeable opening may be, for example, an opening side on the top end of the hard case.

The adsorbing composition 10 mainly used for a gas-adsorbing material may be used in an environment where a target gas (e.g., nitrogen) concentration needs to be reduced (a vacuum-insulating environment). The adsorbing composition 10 may include a metal (for example, a Ba—Li alloy) capable of adsorbing target gas and possibly inactivated by moisture, and has a chemical structure in which the metal that possesses adsorbing properties to the target gas (i.e., not inactivated by moisture) is attached to the particle surface of an additive (for example, an inorganic oxide (calcium oxide)).

In the context of the specification, the "attachment" indicates a state in which particles of the additive are covered (coated) with the metal. By covering (coating) particles of the additive with the metal, provided is a gas-adsorbing composition including an interior layer of the additive and an exterior layer of the metal, which is formed outside the interior layer, according to an embodiment. The interface state between the metal and the additive may have a metal bond, a chemical bond, a physical bond, or the like without a particular limit on the type of bond. As long as the attachment is provided, the interface state between the metal and the additive is not limited according to an embodiment.

The gas-adsorbing metal may be appropriately selected depending on the type of target gas. When the target gas is nitrogen, the gas-adsorbing metal may be at least one selected from lithium (Li), vanadium (V), and zirconium (Zr), for example, a Li metal and/or a Li alloy. Among the Li alloys, a Li alloy with an alkaline-earth metal, particularly, a Li—Ba alloy, may be advantageous due to its relatively high nitrogen-adsorption characteristics.

The additive is used to adjust the concentration of the metal, that is, the amount of the metal per unit weight of the gas-adsorbing material 7. Accordingly, the additive may be expressed as "a vehicle" and the like. The amount of the metal per unit weight of the gas-adsorbing material 7 is reduced due to an additive. Accordingly, for example, a reaction speed is limited despite even a reaction of the nitrogen gas-adsorbing composition 10 with water during the waste disposal of the gas-adsorbing material 7. As a result, combustible gas is suppressed from sudden generation beyond a regulation level. Meanwhile, as for the regulation level, the low limit of explosion of a combustible gas (for example, as for hydrogen gas, 4 vol % in the air) may be referred to.

The additive may be selected from materials having no influence on the gas-adsorption performance of the metal and being capable of absorbing moisture and is not particularly limited. For example, the additive may be an inorganic oxide compatible with a nitrogen-adsorbing metal. Among the inorganic oxides, an alkaline-earth metal-based oxide (a calcium oxide, a magnesium oxide, a strontium oxide, and a barium oxide) may be advantageously used. Specifically, calcium oxide may be beneficial in that it adsorbs moisture even in a very low aqueous vapor pressure environment.

In order to maintain an environment where the gas-adsorbing material 7 is used, a hygroscopic inorganic oxide may be included in the gas-adsorbing material 7, or may be included separately from the gas-adsorbing material 7.

On the other hand, the additive may have a particle diameter of less than or equal to about 500 μm as long as it has no damage to gas-adsorption performance of a gas-adsorbing composition including a metal and an additive. When the particle diameter of the additive is greater than 500 μm, the amount of the metal attached to the additive may be reduced, and thus, the desired nitrogen adsorption performance may not be obtained. Further, the additive may not be homogeneously dispersed in the moisture absorbing material. The lower limit of the additive particulate is not particularly limited, and is not limited by the minimum particle diameter of a currently existent additive particle. In an example embodiment, the particle diameter of the additive may be measured by using a known method, such as, for example, a Laser Diffraction Method, and the average particle diameter may be the diameter of D50.

The inorganic oxide, for example, the calcium oxide, inevitably accompanies moisture in the air due to its moisture adsorption characteristics during manufacture of a gas-adsorbing material even though heat-treated, and thus the gas-adsorbing metal may be inactivated by this moisture even when the gas-adsorbing metal is simply mixed with the inorganic oxide. However, the gas-adsorbing metal may maintain gas-adsorption performance by attaching the gas-adsorbing metal on the particle surface of the inorganic oxide before the gas-adsorbing metal is inactivated (the gas-adsorption performance of the gas-adsorbing metal is in an active state) as has been shown in repeated investigation results. The reason is that the metal is coated on the surface of the inorganic oxide and limits its adsorption reaction.

On the other hand, the additive controls concentration of the gas-adsorbing metal and thus may be called a mother material or a substrate relative to the gas-adsorbing metal.

The gas-adsorbing material 7 according to one example embodiment is included in a reduced pressure environment such as a vacuum insulation material 1 and the like, and thus may adsorb a gas remaining under the reduced pressure environment (for example, gas remaining in micropores of a core material 6 of the vacuum insulation material 1) or gas injected into the reduced pressure environment from the air for a long time, and maintains low thermal conductivity of the reduced pressure environment.

The reduced pressure environment indicates an environment under a lower pressure than atmospheric pressure, and a vacuum insulating environment may be realized by, for example, a pressure of less than or equal to about 100 Pa, specifically, less than or equal to about 10 Pa, and more specifically, less than or equal to about 0.01 Pa.

On the other hand, since the gas-adsorbing material according to one example embodiment may be used for a refrigerator, gas-adsorption performance needs to be maintained in a low temperature environment (around −30° C.).

The metal and the additive in the gas-adsorbing composition may be mixed in an appropriate ratio determined by considering a target gas concentration in an environment where the gas-adsorbing material is used, the limited volume of a space where the gas-adsorbing material is disposed, reduction of combustible gas generated through a reaction of water and the metal when the gas-adsorbing material is discarded, and the like.

When the amount of the additive is more than that of the metal, less combustible gas is generated, but gas-adsorption performance of the metal may be deteriorated, or capacity of the gas-adsorbing material may be increased depending on a kind of the additive.

On the other hand, when the amount of oxide is less than that of the metal, gas-adsorption performance of the metal may not be deteriorated, and capacity of the gas-adsorbing material may not be increased depending on a kind of the additive, such as an oxide, but more combustible gas may be generated.

Accordingly, for example, in a gas-adsorbing composition consisting of a nitrogen gas-adsorption metal and an additive (an inorganic oxide, a transition metal, and the like), as described above, the gas-adsorbing metal and the additive may be mixed in an appropriately adjusted ratio within a range of a regulation level (less than 200 cc/g) of combustible gas rapidly generated when the gas-adsorbing composition is reacted with water.

For example, since a Ba—Li alloy having a $BaLi_4$ composition generates hydrogen at about 440 cc per 1 g, the alloy may be mixed in an amount of less than or equal to about 45 wt % when mixed with an oxide to reduce combustible gas down to less than or equal to the regulation level.

According to another embodiment, a method of fabricating a gas-adsorbing material is provided. The method is not limited to a specific method, as long as it can provide a structure where a metal is attached to a surface of a particle of an additive, whereby the effect according to an embodiment is obtained. The method may include a heat treatment of the metal and the additive. As a result, nitrogen-adsorption performance can be naturally restored in the air. Further, moisture contained in the additive may be reduced, whereby deterioration of the gas-adsorption performance of the metal may be suppressed. The temperature of heat treatment may be determined depending on the kind of the metal or the additive to be used. If the additive is selected from a calcium oxide, and the metal is selected from Ba—Li alloy, the temperature may be from about 180° C. to 1300° C., for example from about 200° C. to 800° C.

For example, the method of the embodiment may include a step of preparing a gas-adsorbing composition including a metal attached to a surface of a particle of an additive, and a step of fabricating an article prepared by coating the obtained gas-adsorbing composition with a moisture-absorbing material.

In an example embodiment of preparing a gas-adsorbing composition, at least an additive and a metal may be admixed in a predetermined ratio to melt, and then may be cooled to a room temperature to become a gas-adsorbing composition. As a result, naturally, a gas-adsorbing composition having a structure of a predetermined attachment may be obtained. In the above method, the additive and the metal are simultaneously heated, and thus prevention of inactivation of the metal and restoration of nitrogen-adsorption performance may be efficiently achieved.

An example embodiment of fabricating an article may include adding the obtained gas-adsorbing composition to a moisture-absorbing material, mixing the same until the gas-adsorbing composition is homogeneously dispersed in the moisture-absorbing material, and calcining the same to become an article.

EXAMPLES

Example 1

0.05 g of $BaLi_4$ (a Ba—Li alloy) (with an average particle diameter of less than or equal to 300 μm, and purity of greater than or equal to 99% Pure Chemical Industries, Ltd.) is heated and melted at 500° C. on a hot plate.

The Ba—Li alloy in a melted state is mixed with 0.2 g of calcium oxide (with an average particle diameter of 4 μm, UBE Materials Industries, Ltd.) already heated up to 500° C. until the mixture is uniform, and then the mixture is cooled down to room temperature, obtaining a nitrogen-adsorbing composition having a coated particle phase.

Figure 3:
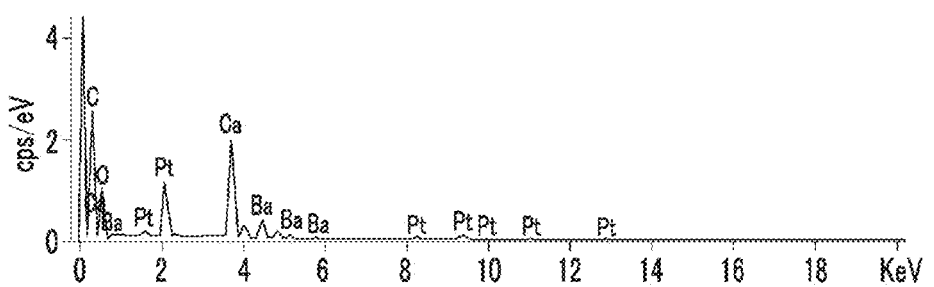
FIG. 3 is an energy-dispersive X-ray spectroscopy (EDS) mapping of a particle-phased nitrogen-adsorbing composition (Example 1).
Figure 4:
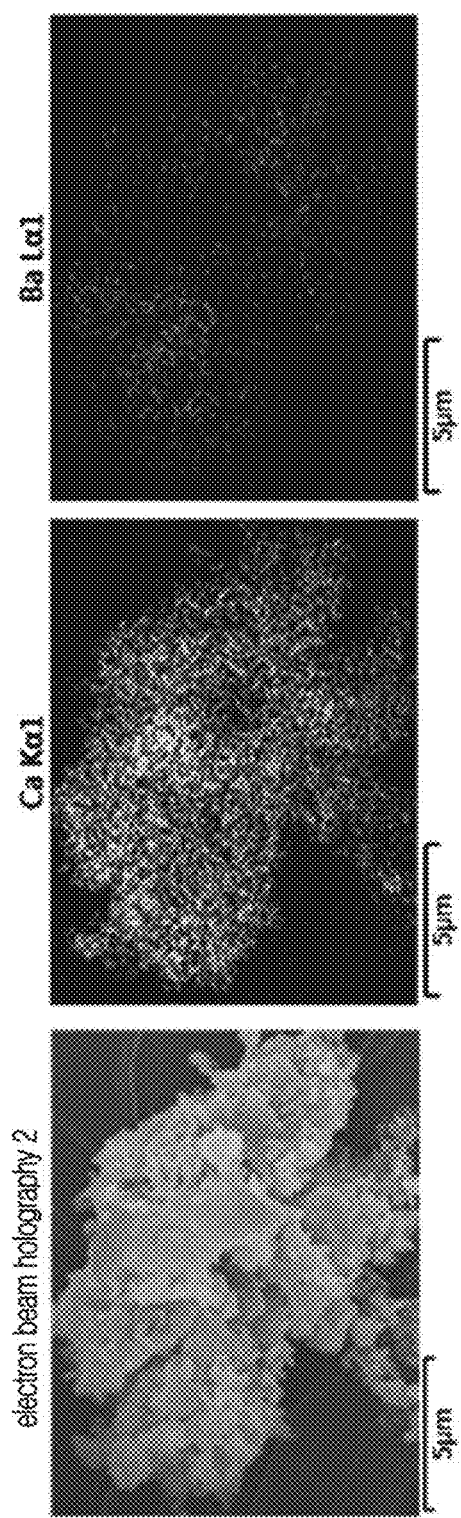
FIG. 4 is the SEM cross-sectional view of a particle-phased nitrogen-adsorbing composition (Example 1).

The obtained $BaLi_4$/CaO particles (a nitrogen-adsorbing composition 10) are fixed on a carbon tape for Pt coating, and then the presence of Ba on the surface of the CaO particle is examined through SEM/EDS (SU-8020, Hitachi High-Technologies Co.) (FIG. 3). In addition, a relationship between the Ca and the Ba is examined through EDS mapping (FIG. 4).

Comparative Example 1

Figure 5:
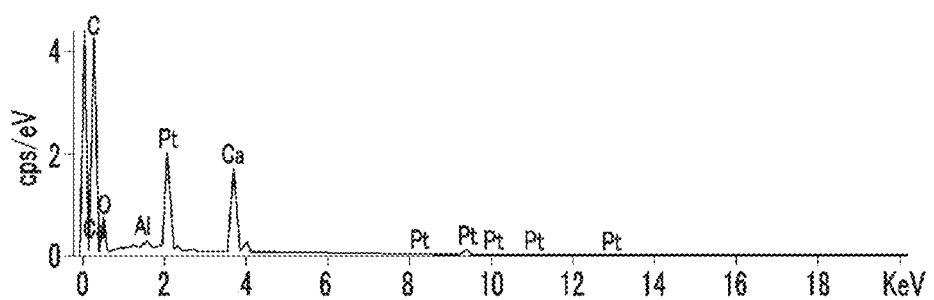
FIG. 5 is an EDS mapping of a particle-phased nitrogen-adsorbing composition (Comparative Example 1).
Figure 6:
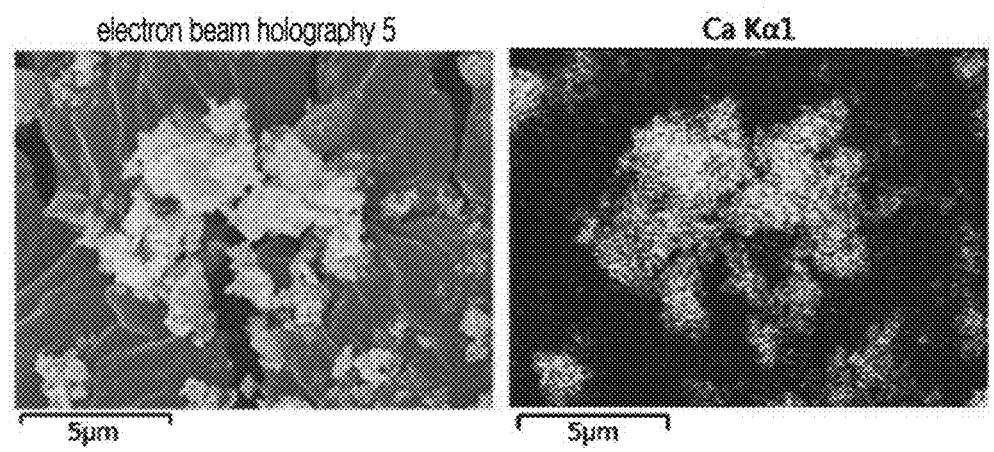
FIG. 6 is the SEM cross-sectional view of a particle-phased nitrogen-adsorbing composition (Comparative Example 2).

0.05 g of the same $BaLi_4$ and 0.2 g of the same calcium oxide as in Example 1 are simply mixed on a specimen plate, preparing a composition. When the obtained composition is observed through SEM/EDS and mapped through EDS, Ba is not present on CaO particles (FIGS. 5 and 6).

Example 2

A gas-adsorbing material 7 is prepared by coating the $BaLi_4$/CaO particles according to Example 1 with a moisture-adsorbing material (CaO) 11 as shown in FIG. 2, and the nitrogen-adsorption performance of the gas-adsorbing material 7 is measured. In Example 2, $BaLi_4$/CaO particles (gas-adsorbing material) are dispersed in a moisture-absorbing material (CaO) to become articles, and the articles are coated with moisture-adsorbing material.

Figure 7:
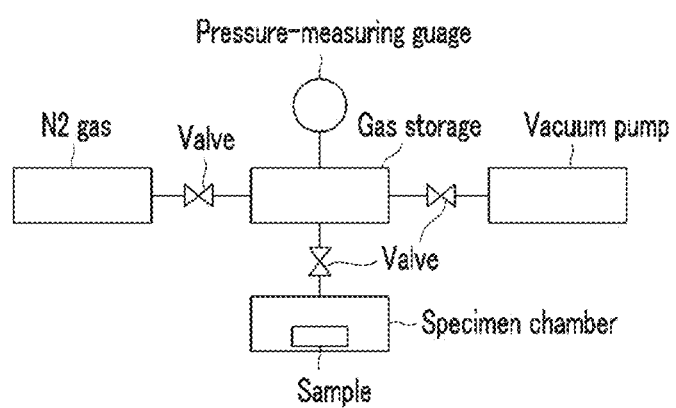
FIG. 7 is a drawing schematically showing a measuring device for nitrogen adsorption (Example 2).

The nitrogen adsorption of the gas-adsorbing material 7 is measured by using a nitrogen-adsorption device shown in FIG. 7. The nitrogen-adsorption device is mounted in a specimen chamber, and the specimen chamber as well as a gas storage are reduced in pressure to less than or equal to 0.1 Pa through a valve by using a vacuum pump. After closing the valve and then opening a valve to the gas storage, nitrogen gas is introduced into the gas storage at up to 60 Pa. After closing the valve and then opening a valve to the specimen chamber, the nitrogen gas is introduced to the specimen chamber, and the pressure change of the nitrogen gas is measured by using a pressure-measuring gauge.

Figure 8:
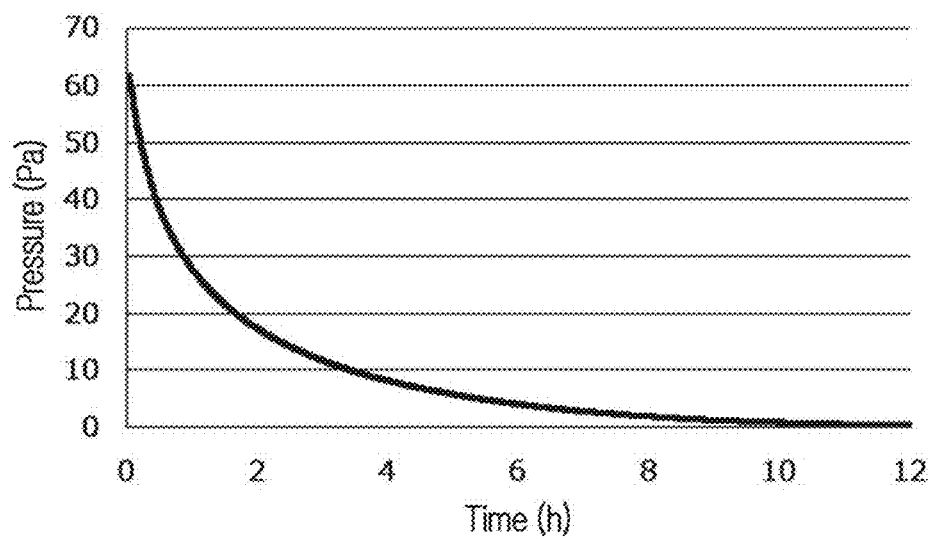
FIG. 8 is a graph showing the measurement results obtained by using the measuring device of FIG. 7 (Example 2).

The measurement results are provided in Table 1 and FIG. 8. The nitrogen adsorption of the nitrogen-adsorbing material is found, since a pressure is decreased as time passes.

TABLE 1

| | Elapsed Time From Start of Measurement (hr) | | | | | |
|---|---|---|---|---|---|---|
| | 2 | 4 | 6 | 8 | 10 | 12 |
| Example 2 | 17.5 Pa | 8.0 Pa | 4.0 Pa | 2.0 Pa | 0.8 Pa | <0.2 Pa |

Example 3

The $BaLi_4$/CaO particles (as a nitrogen-adsorbing composition 10) according to Example 1 are spread at the bottom of a moisture-impermeable metal container 21, as shown in FIG. 9, and are covered with a moisture-adsorbing material 11 (CaO) to prepare a nitrogen-adsorbing material 20, and then nitrogen-adsorption performance of the nitrogen-adsorbing material 20 is measured in the same method as Example 2.

According to the measurement result, a pressure decreased as time passed, showing nitrogen adsorption of a nitrogen-adsorption device.

$BaLi_4$/CaO particles (gas-adsorbing material) are dispersed in moisture-absorbing material (CaO) to become articles, the articles are disposed in a hard case, and then the open side is coated with moisture-adsorbing material.

Example 4

A nitrogen-adsorbing material is manufactured by using a nitrogen-adsorbing composition having a particle phase according to the same method as Example 1, except for changing the lithium alloy of Example 1 to Li.

The nitrogen-adsorption performance of the nitrogen-adsorbing material is measured according to the same method as Example 2.

According to the measurement result, a pressure decreases as time passes, showing nitrogen adsorption of the nitrogen-adsorbing material.

In Example 4, Li/CaO particles (gas-adsorbing material) are dispersed in a moisture-absorbing material to become articles, and the articles are coated with a moisture-adsorbing material.

Comparative Example 2

The nitrogen-adsorption performance of the particle according to Comparative Example 1 is measured according to the same method as Example 2, but neither pressure change nor nitrogen adsorption is found.

Comparative Example 3

The same Li metal and calcium oxide (CaO) as in Example 4 are mixed without heat treatment. The mixture is not uniform from the beginning since the Li metal is soft.

Example 5

The amounts of gas generated during the reaction of the gas-adsorbing material according to Example 1 with water and the reaction of a metal compound (a Ba—Li alloy) with water are respectively measured in a method conforming to Article 8, appendix of a ministerial ordinance regarding dangerous article testing and description of Japan. The amounts of the gas generated are measured by using an apparatus as shown in FIG. 11.

Figure 11:
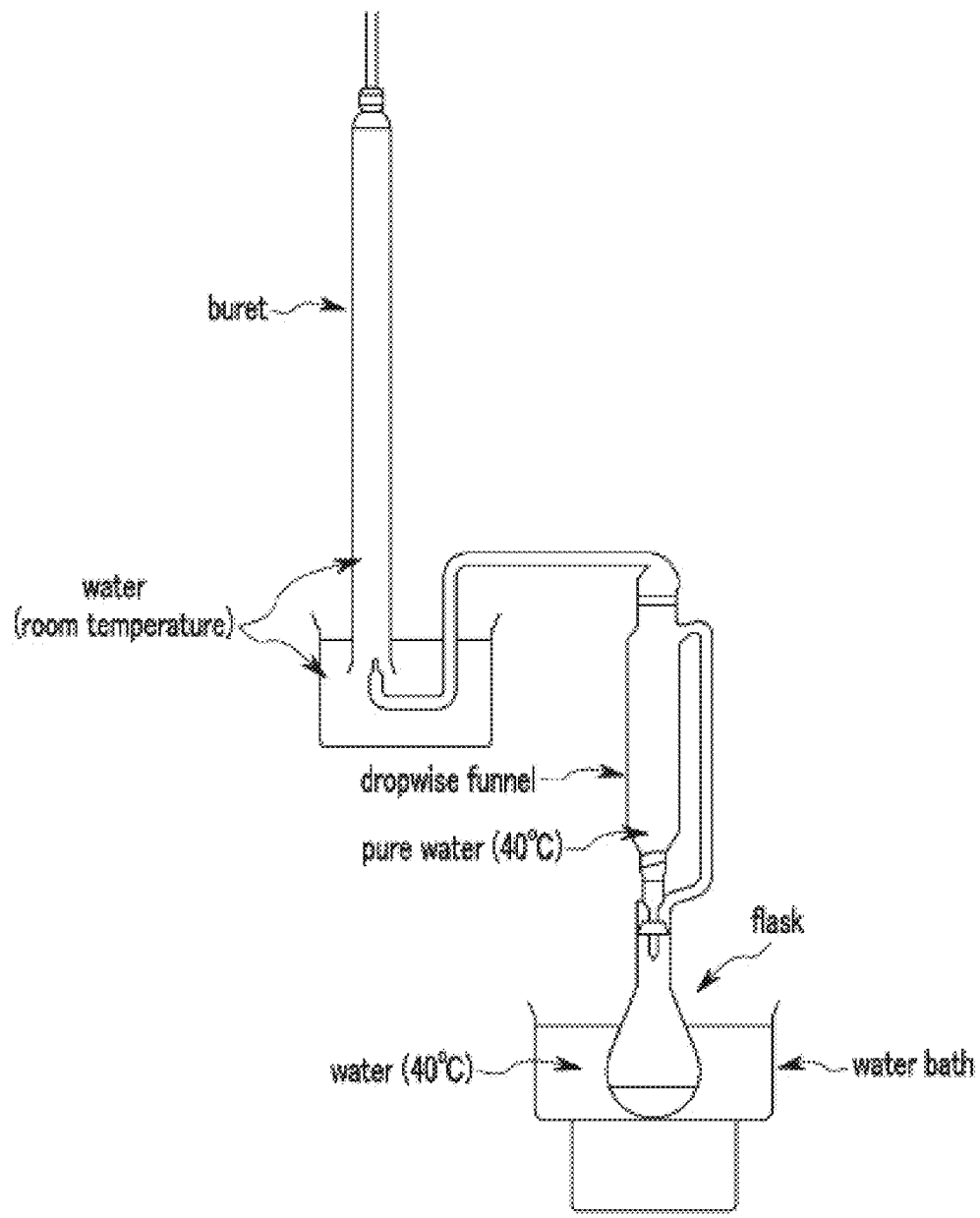
FIG. 11 is a schematic view of an apparatus measuring a gas-adsorbing property.

Predetermined positions of the apparatus shown in FIG. 11 are added with water, except for the dropwise funnel, and the temperature of water is set to be 20±5° C.

Water in the water bath is heated to 40° C., and 50 cm$^3$ of pure water of 40° C. is added to the dropwise funnel. Then, a round-bottom flask (volume of 100 cm$^3$) is added with 2 g of the gas-adsorbing material according to Example 1, and the pure water in the dropwise funnel is rapidly added to the round-bottom flask, while starting agitation with a stirrer. The amount of gas generated is measured every 1 hour over 5 hours. The amount of gas generated at one test is calculated by converting the amount of gas generated in one hour per 1 kg of sample.

Comparative Example 4

With the same method as in Example 5, the amount of gas generated when 0.2 g of the metal compound (Ba—Li alloy) reacts with water is measured. In Comparative Example 4, in order not to generate a great amount of gas, the amount of the metal compound is adjusted as above.

As a result of the measurement, in Comparative Example 4 (Ba—Li alloy), it is confirmed that 550 cc/g of gas including hydrogen is generated. Meanwhile, the amount of gas generated from the particulate nitrogen-adsorbing material according to Example 1 is 138 cc/g, i.e., less than 200 cc/g of a combustible gas.

Example 6

0.05 g of BaLi$_4$ (Ba—Li alloy) (with an average particle diameter of less than or equal to 300 μm, and purity of greater than or equal to 99% Pure Chemical Industries, Ltd.) is heated and melted on a hot plate of 500° C. The Ba—Li alloy in a melted state is mixed with 0.2 g of Ti powder (with an average particle diameter of 26 μm, Tohotech Corporation) already heated up to 500° C. until the mixture is uniform, and then the mixture is cooled down to room temperature, obtaining a nitrogen-adsorbing composition according to Example 6. Upon observation with SEM/EDS (Hitach Hitech, Su-8020), it is confirmed that the Ba—Li alloy is attached to a surface of Ti powder.

Example 7

0.05 g of BaLi$_4$ (Ba—Li alloy) (with an average particle diameter of less than or equal to 300 μm, and purity of greater than or equal to 99% Pure Chemical Industries, Ltd.) is heated and melted on a hot plate of 500° C. The Ba—Li alloy in a melted state is mixed with 0.2 g of Fe powder (with an average particle diameter of 4 μm, Tohotech Corporation) already heated up to 500° C. until the mixture is uniform, and then the mixture is cooled down to room temperature, obtaining a nitrogen-adsorbing composition according to Example 7. Upon observation with SEM/EDS (Hitach Hitech, Su-8020), it is confirmed that Ba—Li alloy is attached to a surface of Fe powder.

The nitrogen-adsorbing compositions according to Example 6 and Example 7 are respectively dispersed in a moisture-absorbing material to become articles. Nitrogen-adsorption performances of the obtained articles according to Example 6 and Example 7 are measured with the same method as in Example 2. Nitrogen-adsorption performance is measured with the apparatus as shown in FIG. 11.

Figure 12:
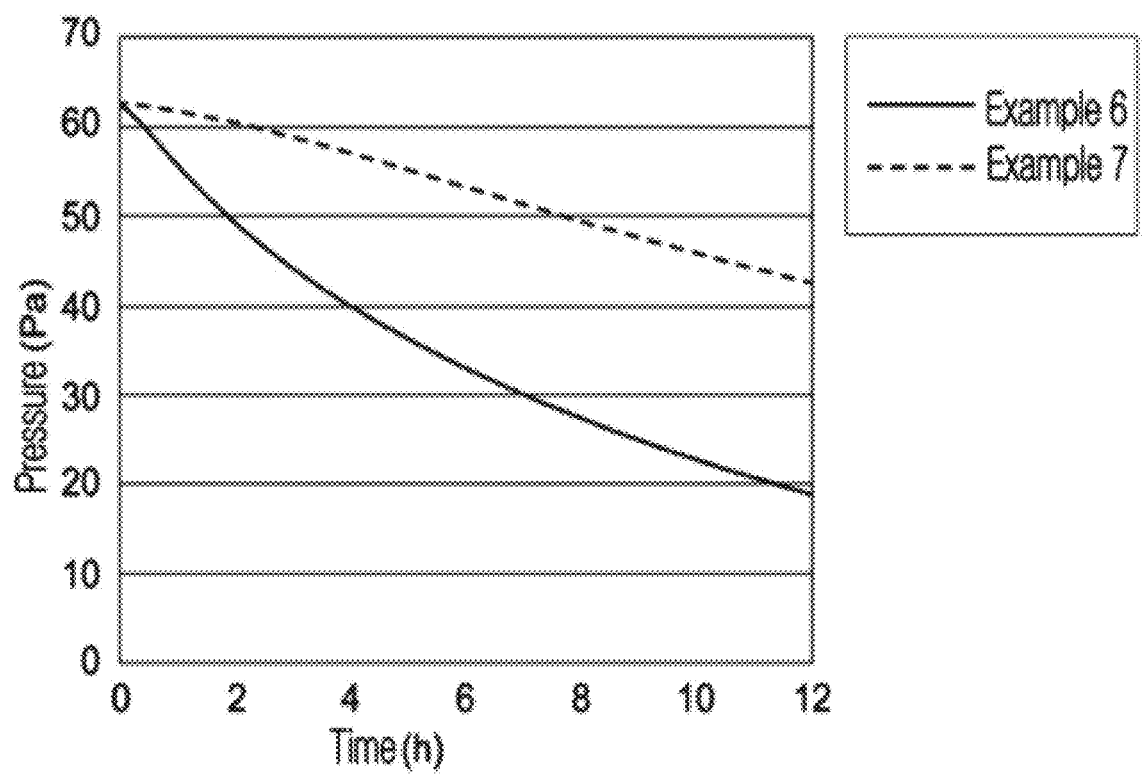
FIG. 12 is a result of a gas-adsorbing rate in an example embodiment.

In the apparatus shown in FIG. 11, after setting the nitrogen-adsorption device in the sample room, valve is open with a vacuum pump, whereby the pressures of the gas storage and the sample room are set to be a vacuum of less than or equal to 0.1 Pa. After closing a valve, valve is open again, and the valve of the gas storage is open for nitrogen gas to introduce up to 60 Pa. After closing the valve, valve is open again, nitrogen gas is introduced into the sample room, and the change of pressure of nitrogen gas is measured with a pressure-measuring gauge. The results are described in Table 2 and FIG. 12.

TABLE 2

| | Elapsed Time from Start of Measurement (hr) | | | | | |
|---|---|---|---|---|---|---|
| | 2 | 4 | 6 | 8 | 10 | 12 |
| Example 6 | 15 Pa | 10 Pa | 7.0 Pa | 4.0 Pa | 1.5 Pa | <0.5 Pa |
| Example 7 | 18 Pa | 9 Pa | 5 Pa | 3 Pa | 0.5 Pa | <0.2 Pa |

Note that in this specification amounts of gas generated are specified at atmospheric pressure. Where an average particle size is referred to, it refers to the mean.

While various examples have been described herein, it should be understood that the application is not limited to the disclosed embodiments. Rather, the application is intended to cover various modifications and equivalent arrangements included within the spirit and scope of the appended claims.

The invention claimed is:

1. A gas-adsorbing material comprising:
   a gas-adsorbing composition, the gas-adsorbing composition including a metal that adsorbs nitrogen gas, the metal including at least one of Li, V, and Zr, or an alloy comprising the same, and
   an additive including a plurality of particles,
   wherein the metal adheres to a surface of at least one of the plurality of particles, and
   the metal encloses the additive.

2. The gas-adsorbing material of claim 1, wherein the metal includes an alloy comprising lithium (Li) and an alkaline-earth metal.

3. The gas-adsorbing material of claim 2, wherein the metal includes an Li—Ba alloy.

4. The gas-adsorbing material of claim 1, wherein the additive includes at least one of an inorganic oxide, a transition metal, an oxide of a transition metal, an alloy comprising a transition metal, and a mixture comprising a transition metal.

5. The gas-adsorbing material of claim 4, wherein the inorganic oxide includes an oxide of at least one alkaline-earth metal.

6. The gas-adsorbing material of claim 4, wherein the inorganic oxide includes a calcium oxide.

7. The gas-adsorbing material of claim 4, wherein the transition metal is at least one of Ti, Ni, or Fe.

8. The gas-adsorbing material of claim 1, further comprising:
   a moisture absorbing material, the moisture absorbing material coating the gas adsorbing composition,
   wherein the gas adsorbing composition includes a target gas adsorbing region,
   wherein the target gas adsorbing region is exposed to allow exposure to a target gas, and wherein the gas adsorbing composition is disposed within the moisture absorbing material.

9. The gas-adsorbing material of claim 1, wherein the metal is admixed with the additive in the gas-adsorbing composition in a ratio such that an amount of a combustible gas generated by the gas-adsorbing material on contact with water is less than or equal to about 200 cc/g.

10. A vacuum insulation module comprising:
the gas-adsorbing material of claim 1; and
a core material enclosing or adjacent to the gas-adsorbing material.

11. The vacuum insulation module of claim 10, further comprising:
an exterior material enclosing the core material and the gas-adsorbing material.

12. The vacuum insulation module of claim 10, wherein the metal includes an alloy comprising lithium (Li) and an alkaline-earth metal.

13. The vacuum insulation module of claim 12, wherein the metal includes an Li—Ba alloy.

14. The vacuum insulation module of claim 11, wherein the additive includes at least one of an inorganic oxide, a transition metal, an oxide of a transition metal, an alloy comprising a transition metal, and a mixture comprising a transition metal.

15. The vacuum insulation module of claim 14, wherein the inorganic oxide includes an oxide of at least one alkaline-earth metal.

16. The vacuum insulation module of claim 14, wherein the inorganic oxide includes a calcium oxide.

17. The vacuum insulation module of claim 14, wherein the transition metal is at least one of Ti, Ni, or Fe.

18. The vacuum insulation module of claim 10, further comprising:
a moisture absorbing material, the moisture absorbing material coating the gas adsorbing composition,
wherein the gas adsorbing composition includes a target gas adsorbing region,
wherein the target gas adsorbing region is exposed to allow exposure to a target gas, and
wherein the gas adsorbing composition is disposed within the moisture absorbing material.

19. The vacuum insulation module of claim 10, wherein the metal is admixed with the additive in the gas-adsorbing composition in a ratio such that an amount of a combustible gas generated by the gas-adsorbing material on contact with water is less than or equal to about 200 cc/g.

20. A device comprising:
the vacuum insulation module of claim 10.

21. The device of claim 20, wherein the device is one of a freezer, a refrigerator, a hot water supply, a heat insulating material for an automobile, a building, a vending machine, a cold-reserving box, a thermostat, or a cold-reserving car.

* * * * *